United States Patent
Pathak et al.

(10) Patent No.: US 9,807,015 B2
(45) Date of Patent: Oct. 31, 2017

(54) MESSAGE PROCESSING USING DYNAMIC LOAD BALANCING QUEUES IN A MESSAGING SYSTEM

(71) Applicant: Dell Products L.P., Round Rock, TX (US)

(72) Inventors: Anshuman Pathak, Bangalore (IN); Balasubramanian Srinivasan, Bangalore (IN); Gautham Devanga Nagabushana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 645 days.

(21) Appl. No.: 14/219,771

(22) Filed: Mar. 19, 2014

(65) Prior Publication Data

US 2015/0271256 A1    Sep. 24, 2015

(51) Int. Cl.
*H04L 12/863* (2013.01)
*H04L 12/803* (2013.01)
*H04L 12/835* (2013.01)
*G06F 9/46* (2006.01)

(52) U.S. Cl.
CPC .............. *H04L 47/125* (2013.01); *G06F 9/46* (2013.01); *H04L 47/30* (2013.01); *H04L 47/6225* (2013.01)

(58) Field of Classification Search
CPC .............. H04L 47/6225; H04L 47/622; H04L 67/1002; H04L 47/125; H04L 47/30; G06F 9/546; G06F 2209/548; G06F 2209/541; G06F 8/20; G06F 9/46
See application file for complete search history.

(56) References Cited

U.S. PATENT DOCUMENTS

| | | | | |
|---|---|---|---|---|
| 6,742,015 B1* | 5/2004 | Bowman-Amuah | ..... | G06F 8/20 709/223 |
| 7,188,158 B1* | 3/2007 | Stanton | .................. | G06F 9/541 709/220 |
| 8,266,290 B2* | 9/2012 | Calder | .................... | G06F 9/546 709/206 |
| 8,918,761 B1* | 12/2014 | Whitcomb | ................ | G06F 8/71 709/223 |
| 9,038,015 B1* | 5/2015 | Allsbrook | ................. | G06F 8/35 717/100 |
| 2004/0088394 A1* | 5/2004 | Brinton | ............... | H04L 67/1008 709/223 |
| 2008/0123671 A1* | 5/2008 | Spencer | .................. | H04L 47/10 370/412 |

(Continued)

*Primary Examiner* — Vivek Srivastava
*Assistant Examiner* — Todd L Barker
(74) *Attorney, Agent, or Firm* — Terrile, Cannatti, Chambers & Holland, LLP; Stephen A. Terrile (57) ABSTRACT

A system, method, and computer-readable medium are disclosed for dynamically managing message queues to balance processing loads in a message-oriented middleware environment. A first source message associated with a first target is received, followed by generating a first dynamic load balancing message queue when a first message queue associated with the first target is determined to not be optimal. The first dynamic load balancing message queue is then associated with the first target, followed by enqueueing the first source message to the first dynamic load balancing message queue for processing by the first target.

15 Claims, 5 Drawing Sheets

(56) References Cited

U.S. PATENT DOCUMENTS

| | | | | |
|---|---|---|---|---|
| 2008/0256245 A1* | 10/2008 | Parmar | H04L 67/2842 | 709/228 |
| 2012/0246316 A1* | 9/2012 | Ramu | G06F 9/44521 | 709/226 |
| 2012/0307641 A1* | 12/2012 | Arumilli | H04L 47/125 | 370/241 |
| 2013/0036427 A1* | 2/2013 | Chen | G06F 9/546 | 719/312 |
| 2013/0055288 A1* | 2/2013 | Jonnagadla | G06F 9/546 | 719/317 |
| 2013/0124574 A1* | 5/2013 | Brettin | G06F 17/30958 | 707/798 |
| 2013/0246561 A1* | 9/2013 | Paramasivam | G06F 9/5088 | 709/217 |
| 2013/0290513 A1* | 10/2013 | Shikari | G06F 9/546 | 709/224 |
| 2013/0297685 A1* | 11/2013 | McGrath | G06F 9/541 | 709/204 |
| 2014/0359119 A1* | 12/2014 | Spaven | H04L 67/26 | 709/224 |
| 2015/0180942 A1* | 6/2015 | Kraljic | H04L 67/2823 | 709/204 |
| 2015/0207862 A1* | 7/2015 | Imbimbo | G06F 17/30867 | 709/201 |

\* cited by examiner

MESSAGE PROCESSING USING DYNAMIC LOAD BALANCING QUEUES IN A MESSAGING SYSTEM

BACKGROUND OF THE INVENTION

Field of the Invention

The present invention relates to the management of information handling systems. More specifically, embodiments of the invention provide a system, method, and computer-readable medium for dynamically managing message queues to balance processing loads in a message-oriented middleware environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One approach to optimizing the utilization of distributed information handling systems is message-oriented middleware NOM), which provides an infrastructure that allows software components that have been developed independently, and run on different networked platforms, to interact with one another. As such, MOM allows software components to be distributed over heterogeneous platforms, which reduces the complexity of developing applications that span multiple operating systems and network protocols. Furthermore, this middleware approach creates a distributed communications layer that helps insulate application developers from details associated with various operating systems and network interfaces.

MOM implementations typically rely upon asynchronous message-passing, as opposed to a request-response architecture, to address issues commonly associated with intermittent connectivity. Likewise, many MOM implementations incorporate a message queue system, which provides temporary storage when the destination application or service component is busy or not connected. As a result, should a receiver application become unavailable for any reason, sender applications can continue unaffected, as the messages they send will accumulate in the message queue for later processing once the receiver becomes available again.

Message queueing offers several advantages, including the loose coupling of applications and the freedom to process messages at their own speed. However, message queues can also become a bottleneck when the throughput of an application is higher and contention on the queue limits the throughput of the entire system. Furthermore, queues with backlogs and contention may become fragmented for certain applications, while others may need to maintain a large file store, all of which may cause performance issues. Moreover, there are also practical limits on the connections that can be made at the queue manager level, as well as unexpected unavailability or inaccessibility of a given queue at a particular time. One approach to addressing these issues is through the implementation of load balancing across distributed message queues. However, the effectiveness of known approaches to such load balancing is limited by the failure to provide dynamic addition and removal of message queues.

SUMMARY OF THE INVENTION

A system, method, and computer-readable medium are disclosed for dynamically managing message queues to balance processing loads in a message-oriented middleware environment. In one embodiment, a first source message associated with a first target is received, followed by generating a first dynamic load balancing message queue when a first message queue associated with the first target is determined to not be optimal. The first dynamic load balancing message queue is then associated with the first target, followed by enqueueing the first source message to the first dynamic load balancing message queue for processing by the first target.

In another embodiment, a second source message associated with a second target is received, followed by generating a second dynamic load balancing message queue when a second message queue associated with the second target is determined to not be optimal. The second dynamic load balancing message queue is then associated with the second target, followed by enqueueing the second source message to the second dynamic load balancing message queue for processing by the second target.

In yet another embodiment, a third source message associated with the first target is received, followed by generating a third dynamic load balancing message queue when neither the first message queue nor the first dynamic load balancing message queue is determined to be optimal. The third dynamic load balancing message queue is then associated with the first target, followed by enqueueing the third source message to the third dynamic load balancing message queue for processing by the first target.

In still another embodiment, a fourth source message associated with the second target is received, followed by generating a fourth dynamic load balancing message queue when neither the second message queue nor the second dynamic load balancing message queue is determined to be optimal. The fourth dynamic load balancing message queue is then associated with the second target, followed by enqueueing the fourth source message to the fourth dynamic load balancing message queue for processing by the second target.

In one embodiment, the fourth source message is enqueued to the third dynamic load balancing message queue when it is determined to be more optimal than the second message queue, the second dynamic load balancing message queue, and the fourth dynamic load balancing message queue. In this embodiment, the third dynamic load balancing message queue is associated with the second target, which subsequently processes the fourth source message.

In another embodiment, the third source message is enqueued to the fourth dynamic load balancing message queue when it is determined to be more optimal than the first message queue, the first dynamic load balancing message queue, and the third dynamic load balancing message queue. In this embodiment, the fourth dynamic load balancing message queue is associated with the first target, which subsequently processes the third source message.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for dynamically managing message queues to balance processing loads in a message-oriented middleware environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
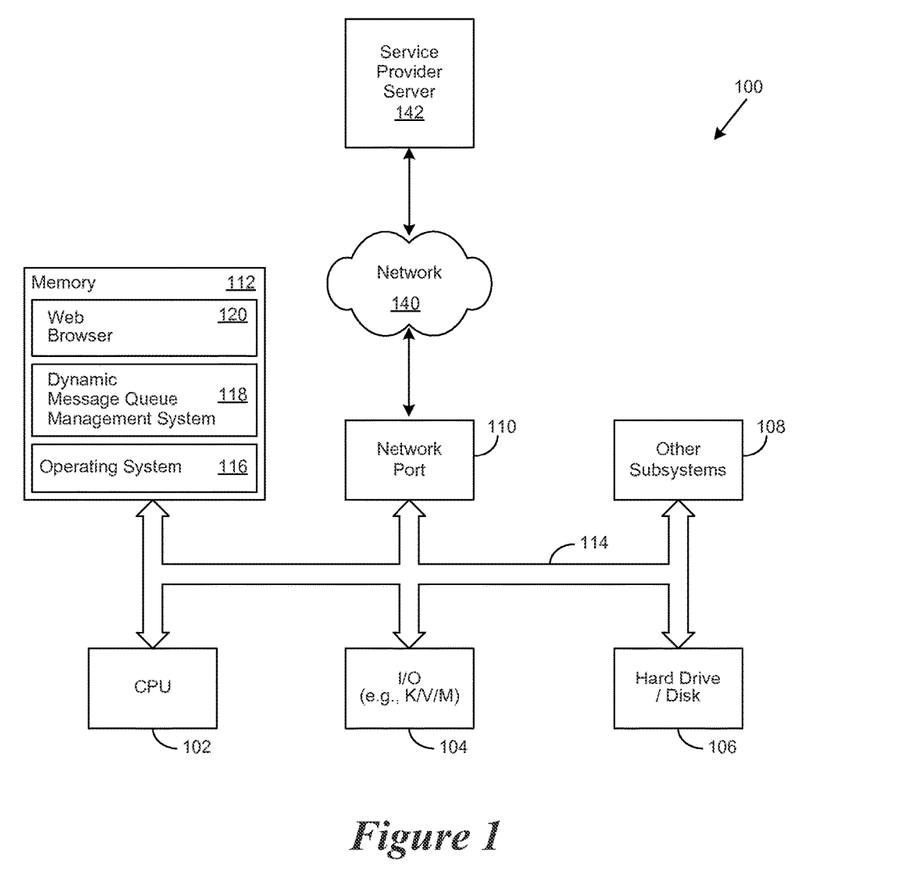
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a dynamic message queue management system 118 and a web browser 120. In one embodiment, the information handling system 100 is able to download the dynamic message queue management system 118 from the service provider server 142. In another embodiment, the dynamic message queue management system 118 is provided as a service from the service provider server 142.

Figure 2:
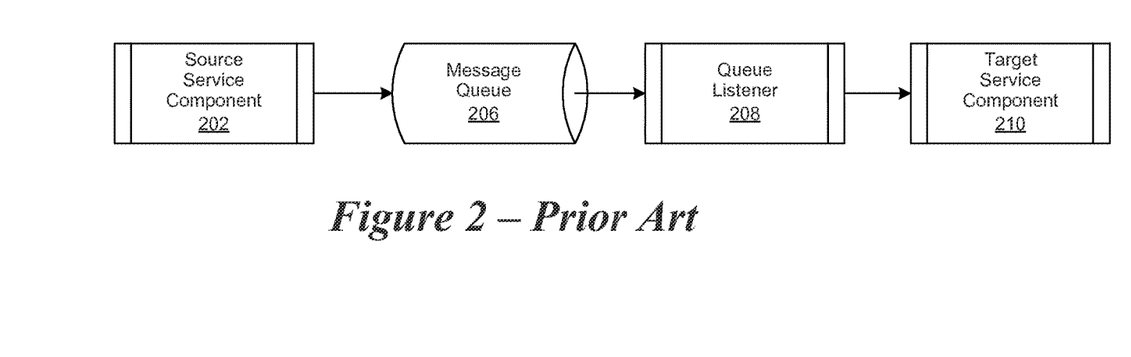
FIG. 2 is a simplified block diagram of a prior art message queue used to perform dynamic message queue management operations.

FIG. 2 is a simplified block diagram of a prior art message queue used in accordance with an embodiment of the invention to perform dynamic message queue management operations. In this embodiment, a source service component 202, such as that used in a Service Component Architecture (SCA), generates a message to be processed by a target service component 210. Once the message is generated, it is then provided to a message queue 206. In various embodiments, there may be additional messages in the message queue 206 waiting to be processed by the target service component 210. In certain embodiments, messages are processed by the target service component 210 in the order they are provided to the message queue 206.

In turn, a queue listener 208 monitors the message queue 206 for the presence of a message and for the availability of the target service component 210. Once the target service component 210 is available, the next message in the message queue 206 is provided by the queue listener 208 to the target service component 210 for processing. Those of skill in the art will be aware that contention for the message queue 206, or a backlog of messages that have been assigned to the message queue 206, can negatively affect the processing throughput associated with the target service component 210. In various embodiments, one or more dynamic load balancing message queues, as described in greater detail herein, are implemented with the message queue 206 to optimize the processing throughput associated with the target service component 210.

Figure 3:
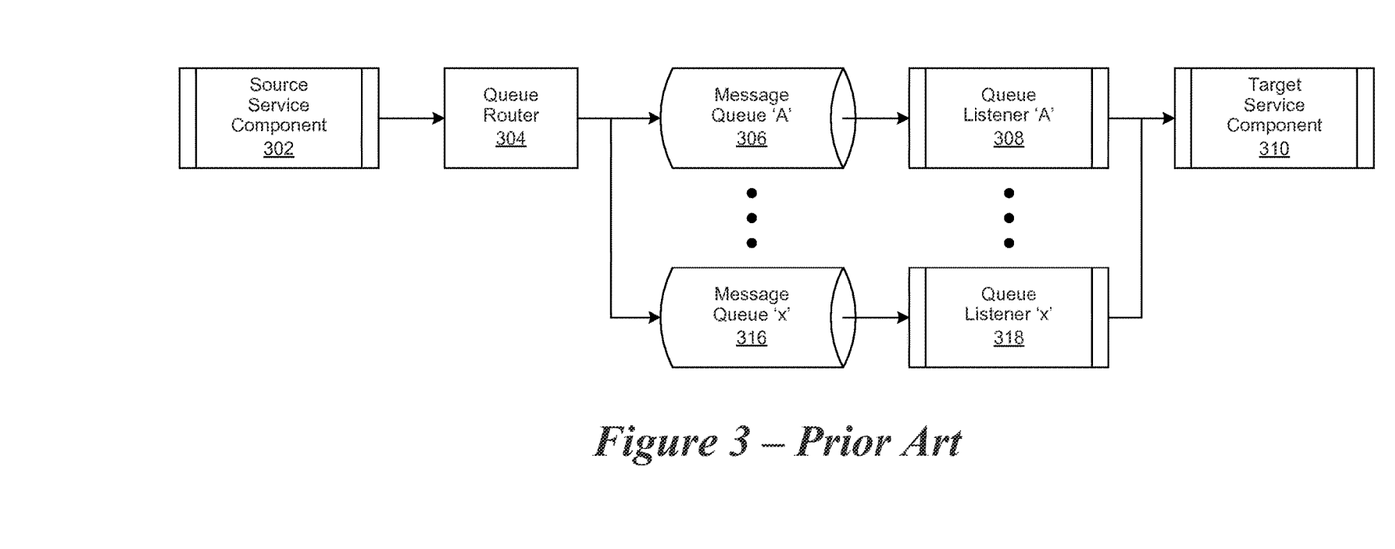
FIG. 3 is a simplified block diagram of prior art parallelized message queues to perform dynamic message queue management operations.

FIG. 3 is a simplified block diagram of a prior art parallelized message queues used in accordance with an embodiment of the invention to perform dynamic message queue management operations. In this embodiment, a source service component 302 generates a message to be processed by a target service component 310. Once the message is generated, it is routed to a predetermined parallelized message queue 'A' 306 through 'x' 316 by a message queue router 304. In various embodiments, there may be additional messages in the predetermined parallelized message queue 'A' 306 through 'x' 316 waiting to be processed by the target service component 310. In certain embodiments, messages are processed by the target service component 310 in the order they were respectively routed to the predetermined parallelized message queue 'A' 306 through 'x' 316.

In one embodiment, the message is assigned by the message router 304 to the predetermined parallelized message queue 'A' 306 through 'x' 316 according to the current number of messages respectively assigned to each of the predetermined message queues 'A' 306 through 'x' 316. As an example, the message queue router 304 may route a message to one of the message queues 'A' 306 through 316 that is currently empty. In another embodiment, the message is assigned by the message router 304 to the predetermined parallelized message queue 'A' 306 through 'x' 316 according to the size of the messages respectively assigned to each of the predetermined message queues 'A' 306 through 'x' 316. For example, the message queue router 304 may route a short message to one of the message queues 'A' 306 through 'x' 316 that currently contains similarly short messages. As another example, the message queue router 304 may route a long message to one of the message queues 'A' 306 through 'x' 316 that is currently empty. Skilled practitioners of the art will realize that many such embodiments are possible and the foregoing is not intended to limit the spirit, scope or intent of the invention.

As the message queue router 304 routes a message to one of the predetermined message queues 'A' 306 through 'x' 316, a corresponding queue listener 'A' 308 through 'x' 318 monitors the message queues 'A' 306 through 'x' 316 for the presence of a message and for the availability of the target service component 310. Once the target service component 310 is available, the next message in the message queues 'A' 306 through 'x' 316 is respectively provided by the queue listener 'A' 308 through 'x' 318 to the target service component 310 for processing. Those of skill in the art will recognize that contention for the message queues 'A' 306 through 'x' 316, or a backlog of messages that have been assigned to the message queues 'A' 306 through 316, can negatively affect the processing throughput associated with the target service component 310. In various embodiments, one or more dynamic load balancing message queues, as described in greater detail herein, are implemented with the parallelized message queues 'A' 306 through 'x' 316 to optimize the processing throughput associated with the target service component 310.

Figure 4:
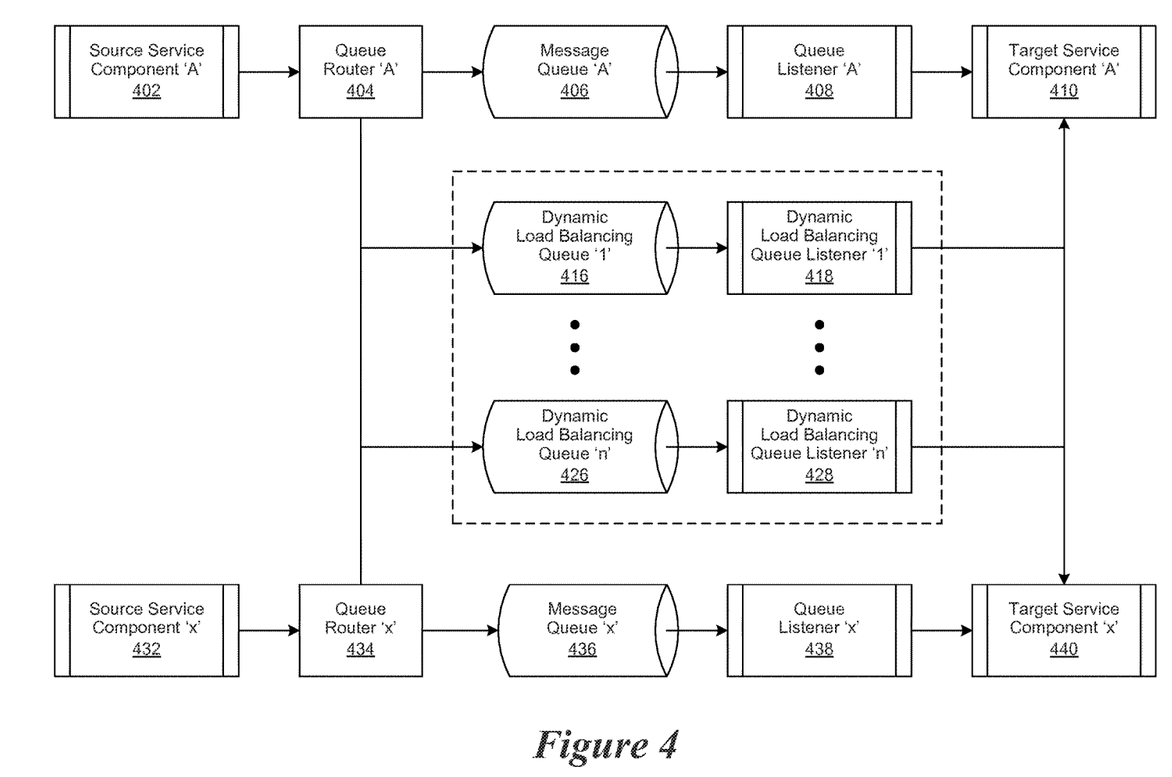
FIG. 4 is a simplified block diagram of dynamic load balancing message queues used to perform dynamic message queue management operations.

FIG. 4 is a simplified block diagram of dynamic load balancing message queues used in accordance with an embodiment of the invention to perform dynamic message queue management operations in a message-oriented middleware (MOM) environment. In this embodiment, source service components 'A' 402 through 'x' 432 generates messages to be respectively processed by target service components 'A' 410 through 'x' 440. Once the messages are generated, they are respectively routed to message queue 'A' 406 through 'x' 436 by message queue routers 'A' 404 through 'x' 434. In turn, queue listeners 'A' 408 through 'x' 438 respectively monitor message queues 'A' 406 through 'x' 438 for the presence of a message and for the corresponding availability of target service components 'A' 410 through 'x' 440. Once the target service components 'A' 410 through 'x' 440 are available, the next message in the corresponding message queues 'A' 406 through 'x' 436 is respectively provided by queue listeners 'A' 408 through 'x' 438 to the corresponding target service component 'A' 410 through 'x' 440 for processing.

In various embodiments, there may be additional messages in the message queue 'A' 406 through 'x' 436 waiting to be respectively processed by the target service components 'A' 410 through 'x' 440. In certain embodiments, messages are processed by the target service components 'A' 410 through 'x' 440 in the order they were respectively routed to the message queue 'A' 406 through 'x' 436 by the message queue routers 'A' 404 through 'x' 434. Those of skill in the art will be aware that contention for the message queues 'A' 0.406 through 'x' 436, or a backlog of messages that have been assigned to the message queues 'A' 406 through 'x' 436, can negatively affect the processing throughput respectively associated with target service components 'A' 410 through 'x' 440.

In certain embodiments, contention for the message queues 'A' 406 through 'x' 436, or backlogs of messages that have been assigned to the message queues through 'x' 436, are reduced by the addition of dynamic load balancing message queues '1' 414 through 'n' 426. In these embodiments, the addition of the dynamic load balancing message queues '1' 412 through 'n' 426 provides additional message queue capacity. As a result, the respective load on message queues 'A' 406 through 'x' 436 is reduced and processing throughput associated with target service components 'A' 410 through 'x' 440 is improved.

In various embodiments, the dynamic load balancing message queues '1' 412 through 'n' 426 are added dynamically when needed, and then removed when they are not. In one embodiment, one or more dynamic load balancing message queues '1' 416 through 'n' 426 are added when a predetermined message queue contention threshold is reached on one or more of the message queues 'A' 406 through 'x' 436. In another embodiment, one or more dynamic load balancing message queues '1' 412 through 'n' 426 are added when a predetermined message queue backlog value is reached on one or more of the message queues 'A' 406 through 'x' 436.

In certain embodiments, message queue routers 'A' 404 through 'x' 434 are used to respectively route messages from source service components 'A' 402 through 'x' 432 to message queues 'A' 406 through 'x' 436. In various embodiments, message queue routers 'A' 404 through 'x' 434 are also able to respectively enqueue messages to dynamic load balancing message queues '1' 416 through 'n' 426 as described in greater detail herein. In certain embodiments, the message queue routers 'A' 404 through 'x' 434 are implemented to read message queue configuration information at runtime from a predetermined location. Based upon the configuration information, the message queue routers 'A' 404 through 'x' 434 make a routing decision to decide whether to enqueue the corresponding message to a target message queue 'A' 406 through 'x' 436 or to a target dynamic load balancing message queue '1' 416 through 'n' 426. In various embodiments, the source service components 'A' 402 through 'x' 432 respectively invoke the message queue routers 'A' 404 through 'x' 434 to determine which of the message queues 'A' 406 through 'x' 436 or dynamic load balancing message queues '1' 416 through 'n' 426 to use to enqueue a predetermined message.

In various embodiments, the additional message queue capacity provided by the dynamic load balancing message queues '1' 416 through 'n' 426 is not required to achieve desired processing throughput associated with target service components 'A' 410 through 'x' 440. In these embodiments, the message queue routers 'A' 404 through 'x' 434 respectively enqueue messages on message queues 'A' 406 through 'x' 436. However, in certain embodiments, the additional message queue capacity provided by dynamic load balancing message queues '1' 416 through 'n' 426 is required to achieve desired processing throughput associated with target service components 'A' 410 through 'x' 440. In these embodiments, the queue configuration of message queues 'A' 408 through 'x' 438 are updated dynamically to utilize one or more of the dynamic load balancing message queues '1' 416 through 'n' 426. In one embodiment, the number of dynamic load balancing message queues '1' 416 through 'n' 426 is included in the queue configuration.

In another embodiment, the algorithm used to distribute messages among the dynamic load balancing message queues '1' 416 through 'n' 426 is likewise included in the queue configuration. In various embodiments, the algorithm may include the following steps:

1. Select all records for the predetermined input logical name.
2. Check for default condition. If there are no records then return the logical name.
3. Check for the rule type (e.g., check if the rule type is THRESHOLD or CONDITIONAL or COMBINED)
4. Determine the mapped physical queue based upon the criteria. If the rule type is CONDITIONAL, and if there are multiple records, then select the record that matches the input parameter values of STATUS, REGION, GLOBAL_BUD, ORIGINATOR_SYSTEM. Null values are be taken into account by checking for the "IS NULL" condition, which would translate to the following conditions:

STATUS=:p_status and global_bu_id=p_global_buid and region_name=p_region and ORIGINATOR_SYSTEM=p_originator_system (or)

STATUS=:p_status and global_bu_id=p_global_buid and region_name is null and ORIGINATOR_SYSTEM=p_originator_system (or)

STATUS=:p_status and global_bu_id is null and region_name=p_region and ORIGINATOR_SYSTEM=p_originator_system (or)

STATUS is null and global_bu_id=p_global_buid and region_name=p_region and ORIGINATOR_SYSTEM=p_originator_system (or)

STATUS=:p_status and global_bu_id is null and region_name is null and ORIGINATOR_SYSTEM=p_originator_system (or)

STATUS is null and global_bu_id=p_global_buid and region_name is null and ORIGINATOR_SYSTEM=p_originator_system (or)

STATUS is null and global_bu_id is null and region_name=p_region and ORIGINATOR_SYSTEM=p_originator_system 5. Determine and append Queue Extension. If the queue extension rule is non null, then pick the queue extension operator and apply the queue extension rule with the queue extension operator on the business_component_id to determine the queue extension. Once the queue extension is determined, it is appended at the end of physical queue name with "_." in various embodiments a. MOD function is supported. In certain embodiments, other queue functions familiar to skilled practitioners of the art are supported. For every function, the value for returning the logical queue name is referenced. For example:

MOD FUNCTION. If the queue extension is MOD, the queue operator will give the MOD divider. The business component ID is divided by the MOD divider to derive the queue extension. This value is then returned as the physical queue name. If the MOD value is 0, then the logical queue name is returned as the physical queue name.

6. Determine the mapped physical queue based upon threshold. If the RULE_TYPE is THRESHOLD, the current backlog of the queue is recorded from the corresponding queue table derived from the logical queue name. For example, this may be accomplished by adding "AQ$_" to the logical queue name. If the current backlog is more than the threshold value then, the load balancing queue with the minimum backlog is chosen as the physical queue name and is returned. In certain embodiments, this can be performed in a scheduled job to reduce querying time. The job can then publish the result to a cache database familiar to those of skill in the art to reduce response time. In one embodiment, an application programming interface (API) is implemented to expose the service in the database cache.

7. Determine the mapped physical queue based on a combination. If the RULE_TYPE is COMBINED, the current backlog of the queue is used to determine if load balancing is needed. If it is not needed, the logical queue is returned as the physical queue name. If one of the dynamic load balancing message queues "1" 416 through 'n' 426 are to be used, then the rules mentioned in step 4 & step 5 above are used to determine the physical queue name.

8. Return the DEST_SERVICE_COMPONENT. For the physical queue name returned, also return the corresponding DEST_SERVICE_COMPONENT found in the record.

In one embodiment, the message queue routers 'A' 404 through 'x' 434 respectively return the physical load balancing queue name, based upon the algorithm. In this embodiment, the source service components 'A' 402 through 'x' 432 then enqueue the message to the corresponding dynamic load balancing message queues '1' 416 through 'n' 426. In another embodiment, the algorithm used for load balancing uses a modulus approach familiar to skilled practitioners of the art, based upon a sequential identifier column to spread the load evenly across the dynamic load balancing message queues '1' 416 through 'n' 426. In certain embodiments, business or domain-specific load balancers are implemented to identify and route the message load to the message queue routers 'A' 406 through 436 and the dynamic load balancing message queues '1' 416 through 'n' 426.

In various embodiments, the messages that are enqueued by the message queue routers 'A' 404 through 'x' 434 are formatted using a common message format. In these embodiments, the message payload itself can be of any type or structure, which is a matter of design choice. However, the message header, which constitutes another part of the message, is implemented in these embodiments to contain metadata associated with the message payload. In certain embodiments, this metadata also includes be the logical queue name, which references the next messaging hop. This logical queue name is passed to the message queue routers 'A' 404 through 'x' 434, which based upon the current queue configuration, is used to enqueue the message to one of the dynamic load balancing message queues '1' 416 through 'n' 426 if applicable.

In various embodiments, the message queue routers 'A' 404 through 'x' 434 also adds the target service component (e.g., target service component 'A' 410 through 'x' 440), that should process the message from the message hop. In these embodiments, this information can either be passed as an input to the message queue routers 'A' 404 through 'x' 434 or stored along with the queue configuration details. In certain embodiments, the queue configuration is stored in a cache familiar to those of skill in the art for faster retrieval.

In certain embodiments, dynamic load balancing queue listeners '1' 418 through 'n' 428 are respectively created and configured to poll messages for each corresponding dynamic load balancing message queues '1' 416 through 'n' 426. In these embodiments, the dynamic load balancing queue listeners '1' 418 through 'n' 428 respectively poll messages once they become enqueued on the corresponding dynamic load balancing message queues '1' 416 through 'n' 426. In the polling process, the dynamic load balancing queue listeners '1' 418 through 'n' 428 look up the target service components (e.g., target service component 'A' 410 through 'x' 440), which would then be invoked.

As a result, messages are load-balanced across multiple dynamic load balancing message queues '1' 416 through 'n' 426 and hence, provide faster processing of a backlog of messages. Likewise, since the dynamic load balancing queue listeners '1' 418 through 'n' 428 look up the target service component components (e.g., target service component 'A' 410 through 'x' 440), and route for each individual message, the same load balancing queue can be shared by multiple logical queues at the same time. In various embodiments, any of the dynamic load balancing queues '1' 416 through 'n' 426 can also be used to provide messages to any of the target service components 'A' 410 through 'x' 440.

From the foregoing, skilled practitioners of the art wilt realize that the various embodiments of the invention described herein can help reroute queues of messages originating from different source messaging servers (e.g., source service component 'A' 402 through 'x' 432) whenever a target messaging server (e.g. target service component 'A' 410 through 'x' 440) is unavailable. It will likewise be appreciated that backlog processes can be sped up when a target application (e.g., target service component 'A' 410 through 'x' 440) is unavailable. Likewise, certain of these embodiments result in the dynamic load balancing message queues '1' 416 through 'n' 426 to be used for multiple flows, thereby decreasing hardware requirements, which otherwise would be needed for known rigid message queue parallelization approaches.

Figure 5:
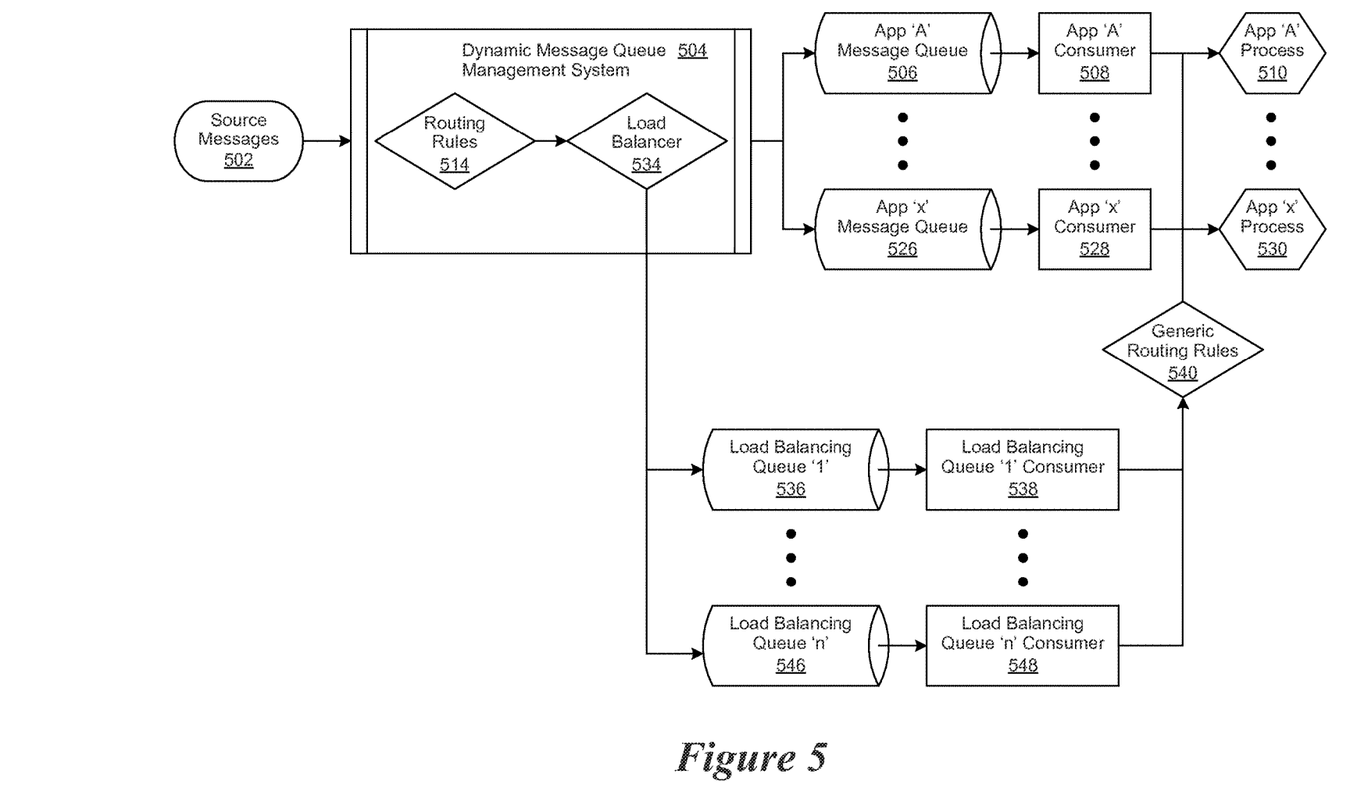
FIG. 5 is a simplified block diagram of a message queue management system that uses routing rules and a load balancer to perform dynamic message queue management operations.

FIG. 5 is a simplified block diagram of a message queue management system that uses routing rules and a load balancer in accordance with an embodiment of the invention to perform dynamic message queue management operations in a message-oriented middleware (MOM) environment. In this embodiment, source messages 502 are received by a message queue management system 504, which includes routing rules 514 and a load balancer 534. In various embodiments, the source messages 502 include messages associated with one or more source service components, which are described in greater detail herein.

Once the source messages 502 are received, they are respectively routed by the message queue management system 504, as described in greater detail herein, to a predetermined application (App) 'A' message queue 506 through App 'x' message queue 526. In various embodiments, the routing of the source messages 502 to a predetermined App 'A' message queue 506 through App 'x' message queue 526 is performed according to routing rules 514. The routing rules, and their implementation with the message queue management system 502, are a matter of design choice.

In turn, App 'A' consumer 508 through App 'x' consumer 528 respectively monitor App 'A' message queue 506 through App 'x' message queue 526 for the presence of a message. Concurrently, App 'A' consumer 508 through App 'x' consumer 528 respectively monitor the corresponding availability of App 'A' process 510 through App 'x' process 530. In various embodiments, App 'A' process 510 through App 'x' process 530 are associated with one or more target service components, which are described in greater detail herein. Once the App 'A' process 510 through App 'x' process 530 are available, the next message in the corresponding App 'A' message queue 506 through App 'x' message queue 526 is respectively provided by App 'A' consumer 508 through App 'x' consumer 528 to the corresponding App 'A' process 510 through App 'x' process 530 for processing.

In various embodiments, there may be additional messages in the App 'A' message queue 506 through App 'x' message queue 526 waiting to be respectively processed by the App 'A' process 510 through App 'x' process 530. In certain embodiments, messages are processed by the App 'A' process 510 through App 'x' process 530 in the order they were respectively routed to the App 'A' message queue 506 through App 'x' message queue 526 by the message queue management system 504. Those of skill in the art will be aware that contention for the message queues App 'A' message queue 506 through App 'x' message queue 526, or a backlog of messages that have been assigned to the App 'A' message queue 506 through App 'x' message queue 526, can negatively affect the processing throughput respectively associated with the App 'A' process 510 through App 'x' process 530.

In certain embodiments, contention for the App 'A' message queue 506 through App 'x' message queue 526, or backlogs of messages that have been assigned to the App 'A' message queue 506 through App 'x' message queue 526, are reduced by the addition of dynamic load balancing message queues '1' 536 through 'n' 546. In these embodiments, the addition of the dynamic load balancing message queues '1' 536 through 'n' 546 provides additional message queue capacity. As a result, the respective load on each of the App 'A' message queue 506 through App 'x' message queue 526 is reduced and processing throughput associated with the App 'A' process 510 through App 'x' process 530 is improved.

In various embodiments, the dynamic load balancing message queues '1' 536 through 'n' 546 are added dynamically when needed, and then removed when they are not. In one embodiment, one or more dynamic load balancing message queues '1' 536 through 'n' 546 are added when a predetermined message queue contention threshold is reached on one or more of the App 'A' message queue 506 through App 'x' message queue 526. In another embodiment, one or more dynamic load balancing message queues '1' 536 through 'n' 546 are added when a predetermined message queue backlog value is reached on one or more of the App 'A' message queue 506 through App 'x' message queue 526.

In certain embodiments, the message queue management system 504 is used to respectively route source messages 502 to the App 'A' message queue 506 through App 'x' message queue 526. In various embodiments, the message queue management system 504 is also able to respectively enqueue messages to dynamic load balancing message queues 536 through 'n' 546 as described in greater detail herein. In certain embodiments, the App 'A' message queue 506 through App 'x' message queue 526 are implemented to read message queue configuration information at runtime from a predetermined location. Based upon the configuration information, the App 'A' message queue 506 through App 'x' message queue 526 make a routing decision to decide whether to enqueue the corresponding message to a target App 'A' message queue 506 through App 'x' message queue 526 or to a target dynamic load balancing message queue '1' 536 through 'n' 546. In various embodiments, the source messages respectively invoke the App 'A' message queue 506 through App 'x' message queue 526 to determine which of the App 'A' message queue 506 through App 'x' message queue 526 or dynamic load balancing message queues '1' 536 through 'n' 546 to use to enqueue a predetermined message.

In various embodiments, the routing of messages to the dynamic load balancing message queues '1' 536 through 'n'

546 is configurable and can be changed dynamically. In certain embodiments, the dynamic routing of the messages to the dynamic load balancing message queues '1' 536 through 'n' 546 is performed according to predetermined configuration and routing rules 514. In various embodiments, the dynamic routing of the messages to the dynamic load balancing message queues '1' 536 through 'n' 546 is performed through the implementation of a load balancer 534. In these various embodiments, the processing loads for App 'A' process 510 through App 'x' process 530 are likewise dynamically distributed across the dynamic load balancing message queues '1' 536 through 'n' 546 to improve associated processing throughput. In certain embodiments, these processing loads are distributed to generic routing rules 540.

In various embodiments, the additional message queue capacity provided by the dynamic load balancing message queues '1' 536 through 'n' 546 is not required to achieve desired processing throughput associated with App 'A' process 510 through App 'x' process 530. In these embodiments, the message queue management system respectively enqueues messages on the App 'A' message queue 506 through App 'x' message queue 526. However, in certain embodiments, the additional message queue capacity provided by the dynamic load balancing message queues '1' 536 through 'n' 546 is required to achieve desired processing throughput associated with the App 'A' process 510 through App 'x' process 530. In these embodiments, the queue configuration of App 'A' message queue 506 through App 'x' message queue 526 are updated dynamically to utilize one or more of the dynamic load balancing message queues '1' 536 through 'n' 546. In one embodiment, the number of dynamic load balancing message queues '1' 536 through 'n' 546 is included in the queue configuration.

In certain embodiments, the App 'A' message queue 506 through App 'x' message queue 526 respectively return the physical load balancing queue name, based upon an algorithm. In these embodiments, the message queue management system 504 then enqueues the message to the corresponding dynamic load balancing message queues '1' 536 through 'n' 546. In certain embodiments, business or domain-specific load balancers, such as load balancer 534, are implemented to identify and route the message load to the App 'A' message queue 506 through App 'x' message queue 526 and the dynamic load balancing message queues '1' 536 through 'n' 546.

In various embodiments, dynamic load balancing queue listeners '1' 538 through 'n' 548 are respectively created and configured to poll messages for each corresponding dynamic load balancing message queues '1' 536 through 'n' 546. In these embodiments, the dynamic load balancing queue listeners '1' 538 through 'n' 548 respectively poll messages once they become enqueued on the corresponding dynamic load balancing message queues '1' 536 through 'n' 546. In the polling process, the dynamic load balancing queue listeners '1' 538 through 'n' 548 look up the App 'A' process 510 through App 'x' process 530 which would then be invoked.

As a result, messages are load-balanced across multiple dynamic load balancing message queues '1' 536 through 'n' 546 and hence, provide faster processing of a backlog of messages. Likewise, since the dynamic load balancing queue listeners '1' 538 through 'n' 548 look up the App 'A' process 510 through App 'x' process 530, and route for each individual message, the same dynamic load balancing queue can be shared by multiple logical queues at the same time.

Figure 6:
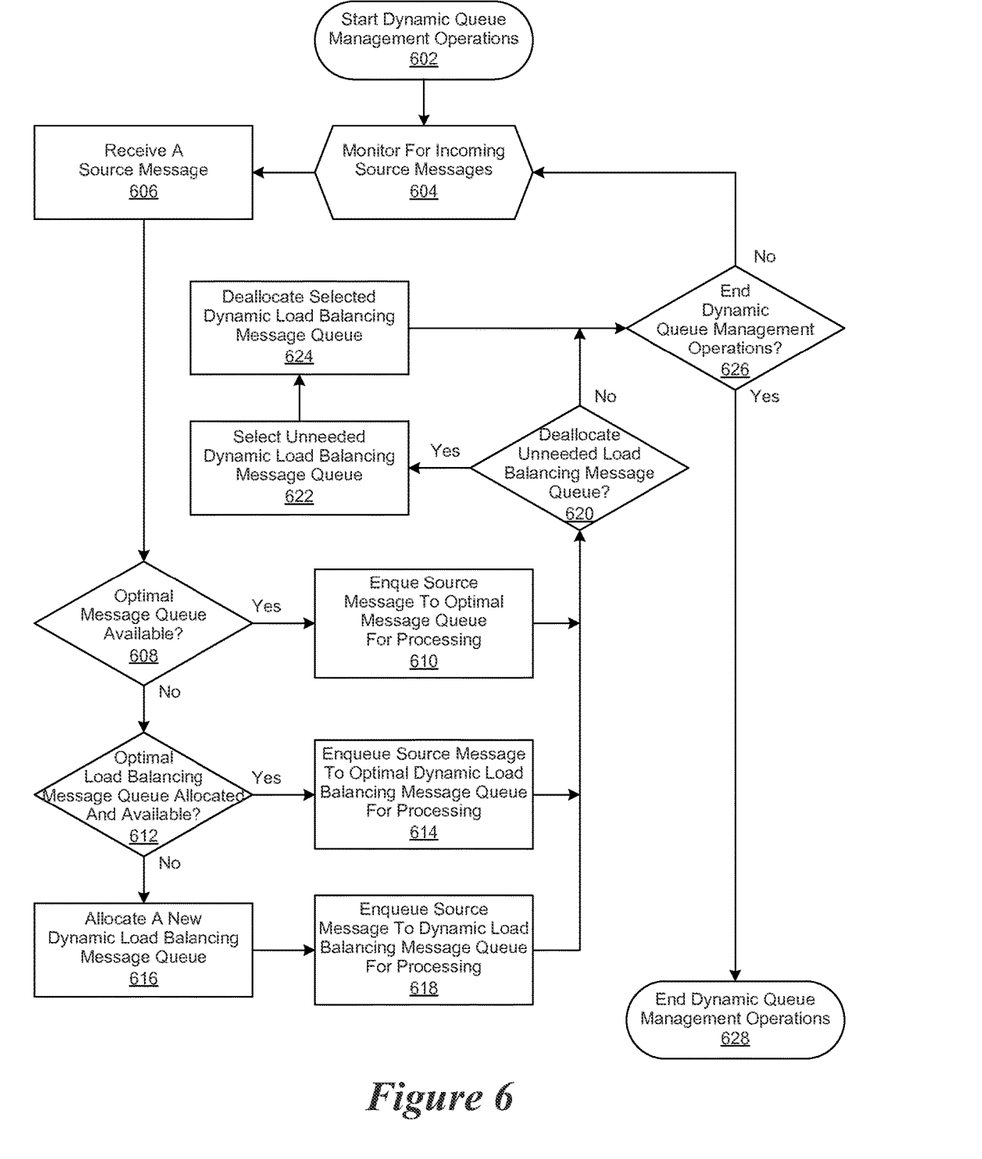
FIG. 6 is a generalized flowchart of the performance of dynamic message queue management operations.

FIG. 6 is a generalized flowchart of the performance of dynamic message queue management operations performed in accordance with an embodiment of the invention. In this embodiment, dynamic message queue management operations are begun in step 602, followed by the performance of monitoring operations in step 604 for incoming source messages. In various embodiments, the monitoring operations are performed by a dynamic message queue management system described in greater detail herein.

A source message is received in step 606, followed by a determination being made in step 608 whether an optimal message queue is available. In various embodiments, as described in greater detail herein, the optimality of a message queue is determined by a predetermined contention threshold or a predetermined message backlog value associated with a message queue. If it is determined in step 608 that an optimal message queue is available, then the source message is enqueued to the optimal message queue for processing in step 610.

A determination is then made in step 620 whether any unneeded dynamic load balancing message queues are to be deallocated, if so, then the unneeded dynamic load balancing message queue is selected in step 622 and then deallocated in step 624. Thereafter, or if it was determined in step 620 that no unneeded dynamic load balancing message queues are to be deallocated, a determination is then made in step 626 whether to end dynamic message queue management operations. If so, then dynamic message queue management operations are ended in step 628. Otherwise, the process is continued, proceeding with step 604.

However, if it was determined in step 608 that an optimal message queue is not available, then a determination is made in step 612 whether an optimal dynamic load balancing message queue has been previously allocated and is available. In various embodiments, as described in greater detail herein, the optimality of a dynamic load balancing message queue is determined by a predetermined contention threshold or a predetermined message backlog value associated with a dynamic load balancing message queue. If it is determined in step 612 that an optimal dynamic load balancing message queue is available, then the source message is enqueued to the optimal dynamic load balancing message queue for processing in step 614 and the process is continued, proceeding with step 620. However, if it was determined in step 612 that an optimal dynamic load balancing message queue is not available or if it is not allocated, then a new dynamic load balancing message queue is allocated in step 616. The source message is then enqueued to the new dynamic load balancing message queue for processing in step 618 and the process is continued, proceeding with step 620.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in respects.

What is claimed is:

1. A computer-implementable method for dynamically managing message queues in a dynamic message-oriented middleware environment, the dynamic message-oriented middleware environment comprising a plurality of message queues and a plurality of dynamic load balancing message queues, comprising:
  receiving a first source message associated with a first target;
  generating a first dynamic load balancing message queue when a first message queue is determined not to be optimal, the first message queue associated with the first target, the first message queue comprising a first application message queue and at least one of a respective first queue listener and a respective first application queue consumer;
  associating the first dynamic load balancing message queue with the first target;
  enqueueing the first source message to the first dynamic load balancing message queue for processing by the first target, the enqueueing the first source message being performed via a message queue router, the message queue router enqueueing the first source message according to routing rules;
  receiving a second source message associated with a second target;
  generating a second dynamic load balancing message queue when a second message queue is determined not to be optimal, the second message queue associated with the second target, the second message queue comprising a second application message queue and at least one of a respective second queue listener and a second application queue consumer, the generating the second dynamic load balancing message queue being performed when at least one of a predetermined message queue contention threshold is reached and when a predetermined message queue backlog value is reached;
  associating the second dynamic load balancing message queue with the second target;
  enqueueing the second source message to the second dynamic load balancing message queue for processing by the second target; and,
  performing a dynamic message queue management operation in the message-oriented middleware environment based upon the receiving the first source message, generating the first dynamic load balancing message queue, associating the first dynamic load balancing message queue, enqueueing the first source message, the receiving the second source message, generating the second dynamic load balancing message queue, associating the second dynamic load balancing message queue, and enqueueing the second source message, the dynamic message queue management operation being performed by a dynamic message queue management system, the dynamic message queue management system comprising a load balancer, the load balancer identifying and routing a message load to one of the first message queue, the second message queue, the first dynamic load balancing message queue and the second dynamic load balancing message queue, the load balancer comprising at least one of a business-specific load balancer and a domain-specific load balancer.

2. The method of claim 1, further comprising:
receiving a third source message associated with the first target;
generating a third dynamic load balancing message queue when the first message queue and the first dynamic load balancing message queue are determined to not be optimal;
associating the third dynamic load balancing message queue with the first target; and
enqueueing the third source message to the third dynamic load balancing message queue for processing by the first target.

3. The method of claim 2, further comprising:
receiving a fourth source message associated with the second target;
generating a fourth dynamic load balancing message queue when the second message queue and the second dynamic load balancing message queue are determined to not be optimal;
associating the fourth dynamic load balancing message queue with the second target; and
enqueueing the fourth source message to the fourth dynamic load balancing message queue for processing by the second target.

4. The method of claim 3, further comprising:
associating the third dynamic load balancing message queue with the second target when the third dynamic load balancing message queue is determined to be more optimal than the second message queue, the second dynamic load balancing message queue, and the fourth dynamic load balancing message queue; and
enqueueing the fourth source message to the third dynamic load balancing message queue for processing by the second target.

5. The method of claim 4, further comprising:
associating the fourth dynamic load balancing message queue with the first target when the fourth dynamic load balancing message queue is determined to be more optimal than the first message queue, the first dynamic load balancing message queue, and the third dynamic load balancing message queue; and enqueueing the third source message to the fourth dynamic load balancing message queue for processing by the first target.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for dynamically managing message queues in a dynamic message-oriented middleware environment, the dynamic message-oriented middleware environment comprising a plurality of message queues and a plurality of dynamic load balancing message queues and comprising instructions executable by the processor and configured for:
receiving a first source message associated with a first target;
generating a first dynamic load balancing message queue when a first message queue is determined not to be optimal, the first message queue associated with the first target, the first message queue comprising a first application message queue and at least one of a respective first queue listener and a respective first application queue consumer;
associating the first dynamic load balancing message queue with the first target;
enqueueing the first source message to the first dynamic load balancing message queue for processing by the first target; and,
receiving a second source message associated with a second target;
generating a second dynamic load balancing message queue when a second message queue is determined not to be optimal, the second message queue associated with the second target, the second message queue comprising a second application message queue and at least one of a respective second queue listener and a second application queue consumer, the generating the second dynamic load balancing message queue being performed when at least one of a predetermined message queue contention threshold is reached and when a predetermined message queue backlog value is reached;
associating the second dynamic load balancing message queue with the second target;
enqueueing the second source message to the second dynamic load balancing message queue for processing by the second target; and,
performing a dynamic message queue management operation in the message-oriented middleware environment based upon the receiving the first source message, generating the first dynamic load balancing message queue, associating the first dynamic load balancing message queue, enqueueing the first source message, the receiving the second source message, generating the second dynamic load balancing message queue, associating the second dynamic load balancing message queue, and enqueueing the second source message, the dynamic message queue management operation being performed by a dynamic message queue management system, the dynamic message queue management system comprising a load balancer, the load balancer identifying and routing a message load to one of the first message queue, the second message queue, the first dynamic load balancing message queue and the second dynamic load balancing message queue, the load balancer comprising at least one of a business-specific load balancer and a domain-specific load balancer.

7. The system of claim 6, further comprising:
receiving a third source message associated with the first target;
generating a third dynamic load balancing message queue when the first message queue and the first dynamic load balancing message queue are determined to not be optimal;
associating the third dynamic load balancing message queue with the first target; and
enqueueing the third source message to the third dynamic load balancing message queue for processing by the first target.

8. The system of claim 7, further comprising:
receiving a fourth source message associated with the second target;
generating a fourth dynamic load balancing message queue when the second message queue and the second dynamic load balancing message queue are determined to not be optimal;
associating the fourth dynamic load balancing message queue with the second target; and
enqueueing the fourth source message to the fourth dynamic load balancing message queue for processing by the second target.

9. The system of claim 8, further comprising:
associating the third dynamic load balancing message queue with the second target when the third dynamic load balancing message queue is determined to be more optimal than the second message queue, the second dynamic load balancing message queue, and the fourth dynamic load balancing message queue; and
enqueueing the fourth source message to the third dynamic load balancing message queue for processing by the second target.

10. The system of claim 9, further comprising:
associating the fourth dynamic load balancing message queue with the first target when the fourth dynamic load balancing message queue is determined to be more optimal than the first message queue, the first dynamic load balancing message queue, and the third dynamic load balancing message queue; and
enqueueing the third source message to the fourth dynamic load balancing message queue for processing by the first target.

11. A non-transitory, computer-readable storage medium embodying computer program code for dynamically managing message queues in a dynamic message-oriented middleware environment, the dynamic message-oriented middleware environment comprising a plurality of message queues and a plurality of dynamic load balancing message queues, the computer program code comprising computer executable instructions configured for:
receiving a first source message associated with a first target;
generating a first dynamic load balancing message queue when a first message queue is determined not to be optimal, the first message queue associated with the first target, the first message queue comprising a first application message queue and at least one of a respective first queue listener and a respective first application queue consumer;
associating the first dynamic load balancing message queue with the first target;

enqueueing the first source message to the first dynamic load balancing message queue for processing by the first target; and, receiving a second source message associated with a second target;

generating a second dynamic load balancing message queue when a second message queue is determined not to be optimal, the second message queue associated with the second target, the second message queue comprising a second application message queue and at least one of a respective second queue listener and a second application queue consumer, the generating the second dynamic load balancing message queue being performed when at least one of a predetermined message queue contention threshold is reached and when a predetermined message queue backlog value is reached;

associating the second dynamic load balancing message queue with the second target;

enqueueing the second source message to the second dynamic load balancing message queue for processing by the second target; and, performing a dynamic message queue management operation in the message-oriented middleware environment based upon the receiving the first source message, generating the first dynamic load balancing message queue, associating the first dynamic load balancing message queue, enqueueing the first source message, the receiving the second source message, generating the second dynamic load balancing message queue, associating the second dynamic load balancing message queue, and enqueueing the second source message, the dynamic message queue management operation being performed by a dynamic message queue management system, the dynamic message queue management system comprising a load balancer, the load balancer identifying and routing a message load to one of the first message queue, the second message queue, the first dynamic load balancing message queue and the second dynamic load balancing message queue, the load balancer comprising at least one of a business-specific load balancer and a domain-specific load balancer.

12. The non-transitory, computer-readable storage medium of claim 11, further comprising:

receiving a third source message associated with the first target;

generating a third dynamic load balancing message queue when the first message queue and the first dynamic load balancing message queue are determined to not be optimal;

associating the third dynamic load balancing message queue with the first target; and enqueueing the third source message to the third dynamic load balancing message queue for processing by the first target.

13. The non-transitory, computer-readable storage medium of claim 12, further comprising:

receiving a fourth source message associated with the second target;

generating a fourth dynamic load balancing message queue when the second message queue and the second dynamic load balancing message queue are determined to not be optimal;

associating the fourth dynamic load balancing message queue with the second target; and enqueueing the fourth source message to the fourth dynamic load balancing message queue for processing by the second target.

14. The non-transitory, computer-readable storage medium of claim 13, further comprising:

associating the third dynamic load balancing message queue with the second target when the third dynamic load balancing message queue is determined to be more optimal than the second message queue, the second dynamic load balancing message queue, and the fourth dynamic load balancing message queue; and enqueueing the fourth source message to the third dynamic load balancing message queue for processing by the second target.

15. The non-transitory, computer-readable storage medium of claim 14, further comprising:

associating the fourth dynamic load balancing message queue with the first target when the fourth dynamic load balancing message queue is determined to be more optimal than the first message queue, the first dynamic load balancing message queue, and the third dynamic load balancing message queue; and enqueueing the third source message to the fourth dynamic load balancing message queue for processing by the first target.

* * * * *